United States Patent [19]

St. Lawrence

[11] Patent Number: 4,735,543
[45] Date of Patent: Apr. 5, 1988

[54] BULK BAG DISCHARGE APPARATUS

[76] Inventor: Thomas W. St. Lawrence, 224 Silverbell Cir., Lake Jackson, Tex. 77566

[21] Appl. No.: 31,865

[22] Filed: Mar. 30, 1987

Related U.S. Application Data

[62] Division of Ser. No. 742,898, Jun. 10, 1985, Pat. No. 4,669,950.

[51] Int. Cl.$^4$ ............................................. B65G 65/26
[52] U.S. Cl. ................................................... 414/421
[58] Field of Search .............. 414/412, 421, 425, 403, 414/404, 419, 411, 786, 414, 291, 1; 222/180, 181, 166, 105; 141/10, 85, 114, 97, 18, 316, 1

[56] References Cited

U.S. PATENT DOCUMENTS

| | | | |
|---|---|---|---|
| 2,578,116 | 12/1951 | White et al. | 414/421 |
| 2,862,645 | 12/1958 | Page et al. | 414/608 X |
| 3,145,858 | 8/1964 | Helbig | 414/412 |
| 3,162,331 | 12/1964 | Hutchins et al. | 414/608 X |
| 3,951,284 | 4/1976 | Fell et al. | 141/10 X |
| 4,119,263 | 10/1978 | Cuthbertson et al. | 414/412 X |
| 4,527,716 | 7/1985 | Haase et al. | 414/412 X |
| 4,541,765 | 9/1985 | Moore | 414/786 X |

FOREIGN PATENT DOCUMENTS

| | | | |
|---|---|---|---|
| 276248 | 11/1969 | Austria | 414/411 |
| 498724 | 4/1929 | Fed. Rep. of Germany | 414/412 |
| 1224206 | 9/1966 | Fed. Rep. of Germany | 414/425 |
| 3207437 | 9/1983 | Fed. Rep. of Germany | 414/412 |
| 202854 | 3/1966 | Sweden | 414/608 |
| 1188572 | 4/1970 | United Kingdom | 414/425 |
| 624847 | 9/1978 | U.S.S.R. | 414/421 |
| 1098888 | 6/1984 | U.S.S.R. | 414/421 |

Primary Examiner—Frank E. Werner
Attorney, Agent, or Firm—Peter F. Casella

[57] ABSTRACT

This invention relates to an apparatus for discharging particulate solids, especially hazardous or toxic materials and contaminants of the atmosphere, from bulk shipping containers, such as bulk-bags, at controlled discharge rates, in an environmentally acceptable manner which eliminates exposure of the environment and personnel to contamination by the material and which allows for an essentially clinically clean environment due to emptying and transfer of the contents to process equipment.

19 Claims, 4 Drawing Sheets

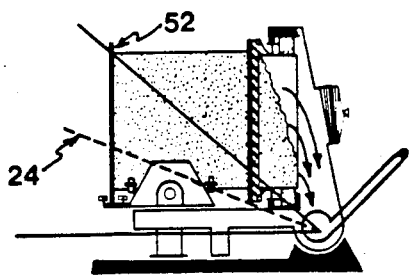
FIGURE 3 – First Stage of Emptying
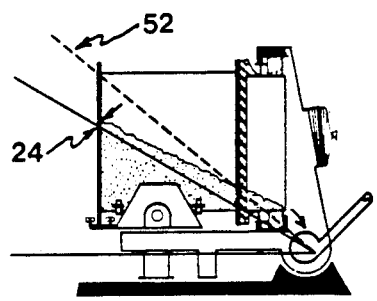
FIGURE 4 – Next Stage of Emptying
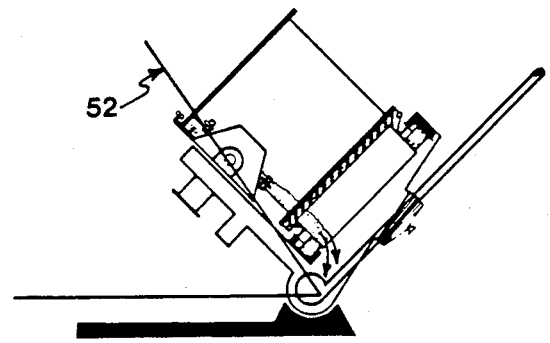
FIGURE 5 – Final Stage of Emptying
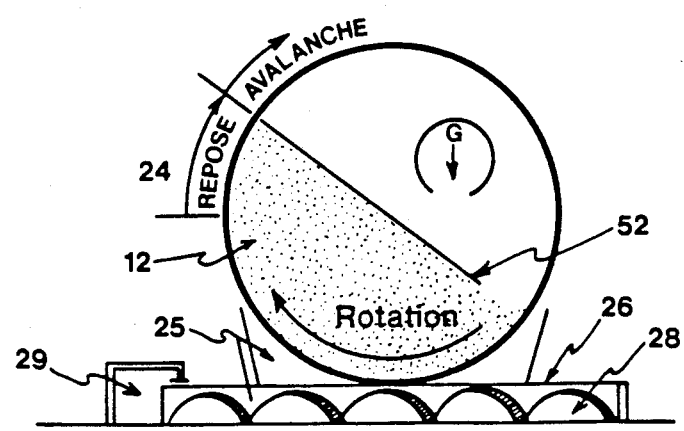
FIGURE 6 – Drum Rotation

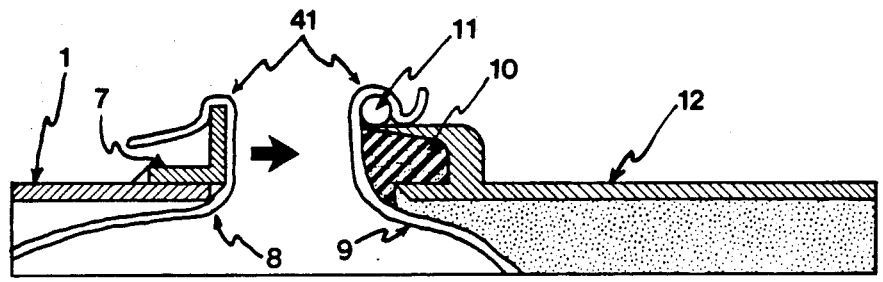
FIGURE 7a – Drum Attachment
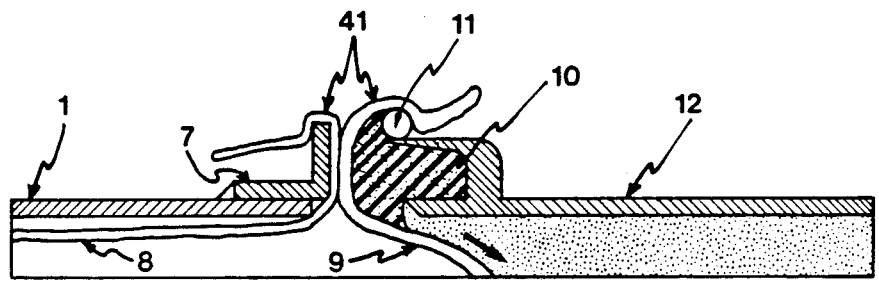
FIGURE 7b – Contact Seal
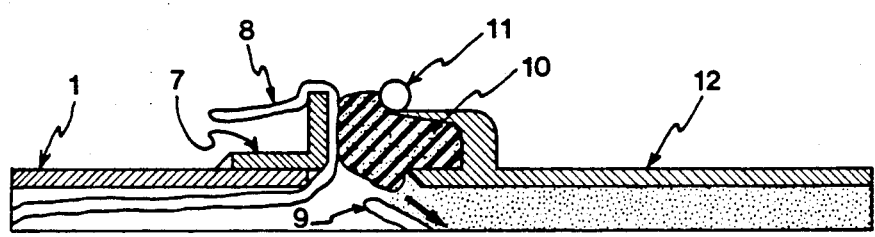
FIGURE 7c – Slip Seal
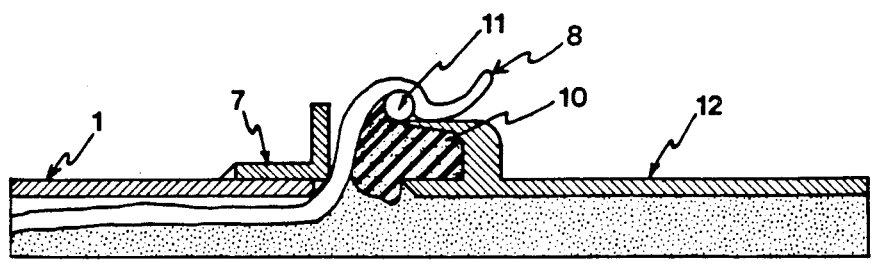
FIGURE 7d – Transfer Seal

BULK BAG DISCHARGE APPARATUS

This application is a division of application Ser. No. 742,898, filed June 10, 1985, now U.S. Pat. No. 4,669,950, issued June 2, 1987.

BACKGROUND OF THE INVENTION

The unprecedented growth of industry since World War II and the introduction of new products to meet consumer demand has led to the need and desire to ship and handle larger quantities of raw materials in bulk containers. The shipping and handling of particulate solids of hazardous or toxic materials or contaminants of the ecosphere in a safe and environmentally acceptable manner has become a requirement of Federal, State and Municipal laws and regulations. Although the laws and regulations have gone a long way in protecting the public and environment from the deleterious effects of many of the harmful and obnoxious materials, they have created problems, both technical and economic for industry in complying with them. Materials such as asbestos, powdered pesticides, ground-up or particulate polymers and resins, pulverized minerals and even bulk shipments and handling of food stuff such as flour and other grains all create problems of varying degree to personnel and the environment when being discharged from bulk shipping containers and when not contained from the environment.

Many methods and techniques have been proposed and used for shipping and handling such materials when in particulate or powdered form. In spite of all the effort and money being spent to ship and handle them in a safe and environmentally acceptable manner, there continues to be a need for improved methods and apparatus for discharging or emptying bulk-bag shipping containers into process equipment in a way that does not contaminate the environment or expose personnel to the dust and fines that are always present during emptying, and in a way that is essentially clinically clean. The bulk-bags employed as shipping containers are made of flexible fabric, such as woven poly-propylene, and are capable of holding several hundred pounds of particulate solids. A generally available size has a capacity of about a ton, however they come in larger and smaller capacities and can be manufactured to hold several tons of particulate dry solids.

It is common for industry to use bulk-bag containers as an efficient means to ship, receive, and handle raw materials. It is cost-effective for the shipper, transporter, and recipient. A problem with the use of bulk-bag containers is the difficulty in emptying the contents of many dry particulate solids. During transit, many products compress and compact to a point such that they will not gravity-flow out of the discharge spouts in the bulk-bags. Methods such as reverse soil mechanics must be employed to break up the mass and allow it to flow again. Each material has its own characteristics and usually requires individual effort to overcome its particular problems. In addition and perhaps most important, the attachment of bulk-bags to process equipment involves an operator connecting and disconnecting the spouts at which time exposure of the contents of the bulk-bag takes place. This operator and environmental exposure is a problem inherent in the current methods used to discharge bulk-bags.

OBJECTS OF THE INVENTION

Accordingly it is an object of this invention to provide methods and apparatus by which the particulate contents of a bulk-bag container can be discharged and/or transferred to process equipment in an essentially clinically clean manner with no significant exposure of the contents to personnel or the environment.

Another object is to allow for the control of the rate of discharge of the particulate materials from the bulk-bag to the process equipment receiving the material.

Still another object is to provide a system which is readily adaptable to handle bulk-bags currently available in domestic and foreign commerce having various capacities and shapes and which are made of different materials.

A further object is to provide methods, apparatus and systems for discharging and/or transferring particulate materials, which are hazardous or obnoxious in powdered or dust form either to personnel or the environment, from bulk-bags to process equipment, in an economical and efficient manner and on a commercial scale, which meet the Federal, State and Municipal laws and regulations on safety, health and protection of the environment.

Other objects will be discussed hereinafter and still others will become apparent from a consideration of the Description of the Invention and Drawings which follows.

DESCRIPTION OF THE INVENTION AND DRAWINGS

This invention is described with reference to an existing embodiment, in order that it may be more readily understood, however it is to be understood that it is not intended to limit the scope of this invention except as defined in the appended claims.

FIGS. 3, 4, and 5 show the assembled apparatus in 3 different stages of operation.

FIG. 6 is a diagram of a front view looking into the discharge end of the rotating drum during the emptying cycle and is given to facilitate an explanation of the mechanics of flow of solid particulate materials being discharged in accordance with this invention.

FIGS. 7a, 7b, 7c and 7d are detail sketches showing the drum attachment, the contact seal, the slip seal and the transfer seal, respectively.

Figure 1:
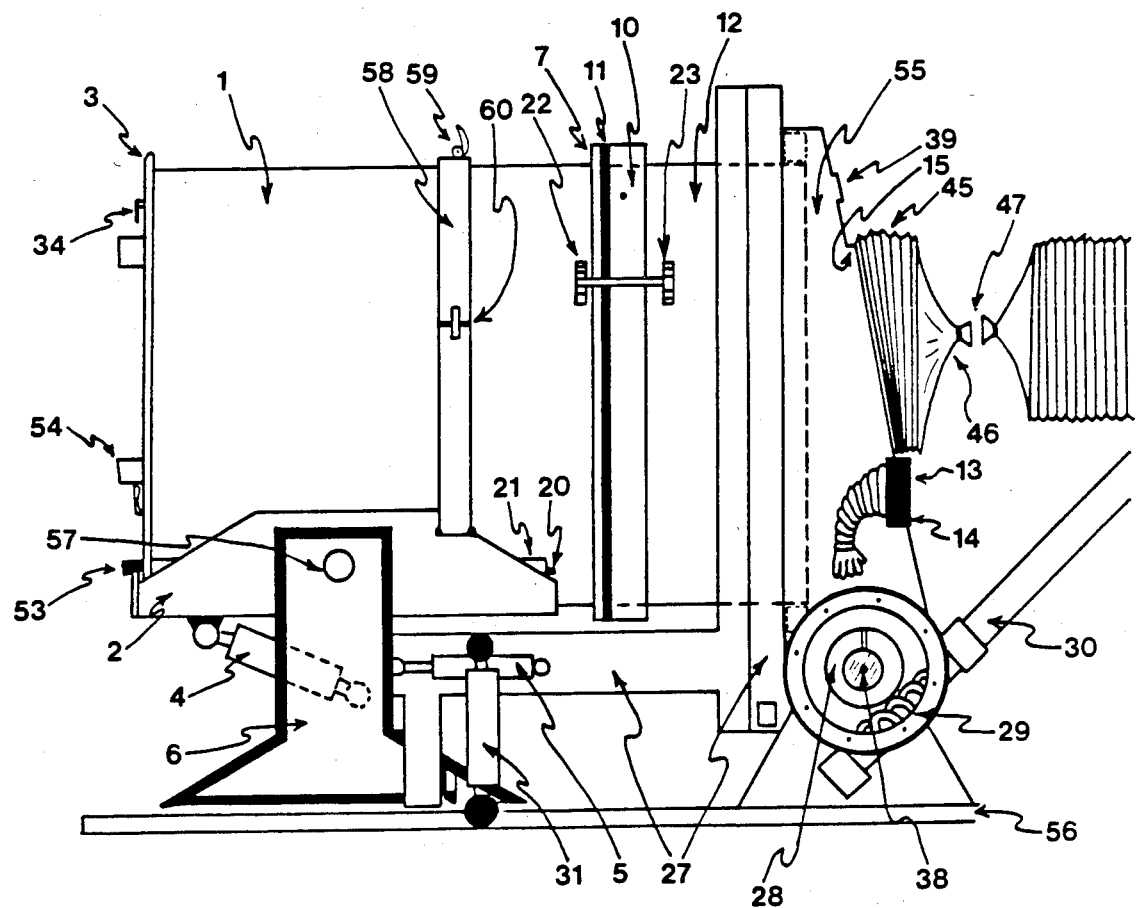
FIG. 1 is a diagrammatic sketch of the assembled system including the various components of this invention.
Figure 2:
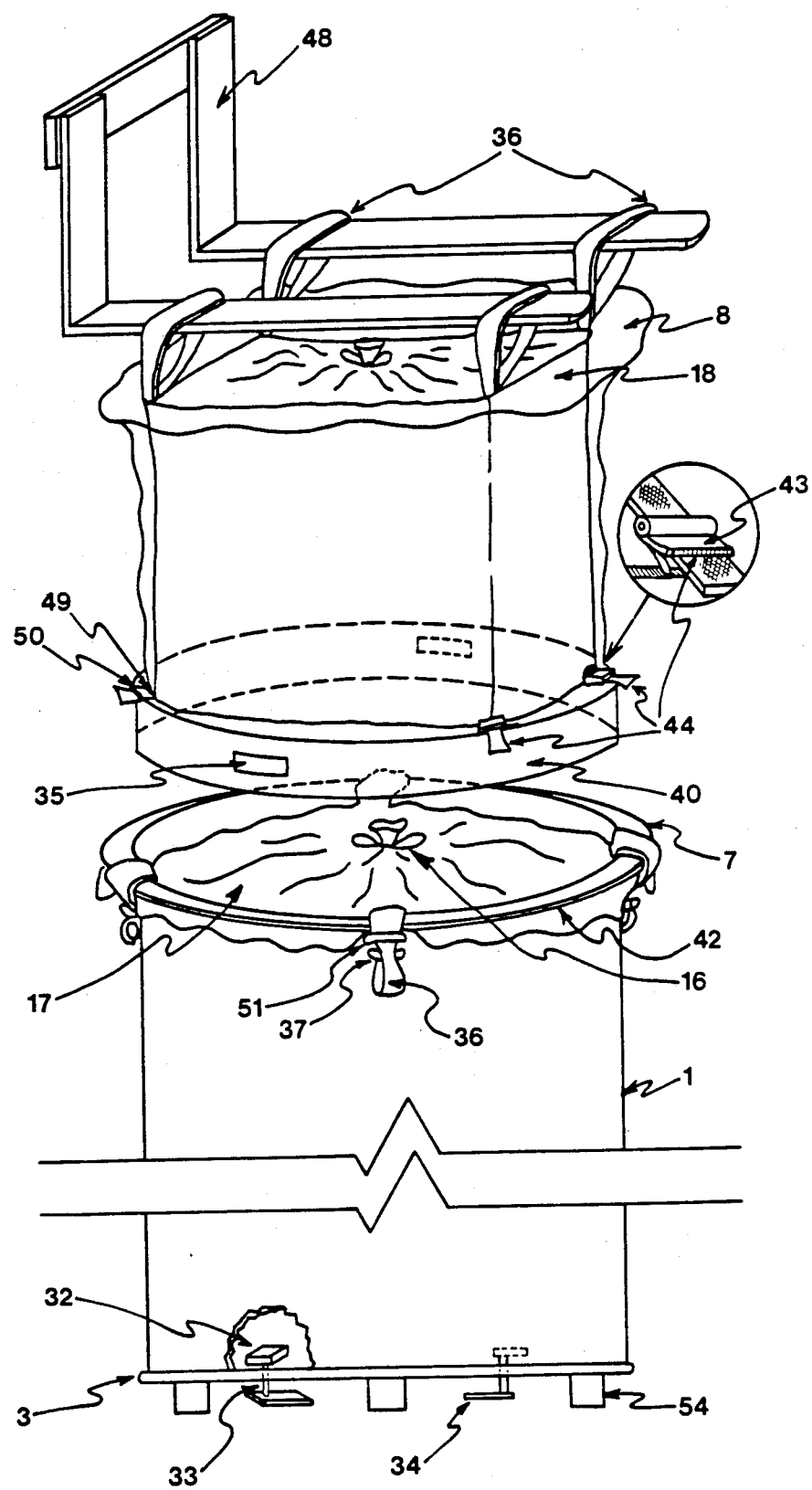
FIG. 2 is a diagrammatic sketch of the bulk-bag and strap clamp as the bulk-bag is prepared and being loaded into the drum.

Referring to the Figures, the bulk-bag {18} shown in FIG. 2, is readied for emptying in the assembly shown in FIG. 1 as follows.

Using a lifting devise such as a fork-lift {48}, the operator attaches the four loops {36} of the filled, sealed bulk-bag {18} to lifting forks of his fork-lift {48} and elevates the bulk-bag {18} to a comfortable height of approximately eight (8) feet. A new thermoplastic poly-envelope {8} of sufficient circumference and height is pulled up from the bottom of the bulk-bag {18} such that the envelope {8} encases, extends and is temporarily held in place above the top of the bulk-bag {18}. The straps {44} at the bottom of the bulk-bag {18} are pushed through small holes {49} made in the poly-envelope. A means such as plastic tape {50} or rope is used to affix and seal the bottom straps {44} of the bulk-bag {18} to the poly-envelope {8}. A strap-holding-device {40} is then placed below the elevated, enveloped, bulk-bag {18} such that the strap clamps {43} are positioned directly below the straps. The four straps {44} are individually secured to the four strap clamps {43} until the strap-holding-device {40} is firmly attached. The resulting assembly is lowered into an empty drum {1} while the internal locking-lugs {32} of the strap-holding-device {40}, attached by a shaft {33}, and actuated by the external locking lug handles {34} are maintained in an "unlocked" position during the loading, after which the external lock-lug handles {34} turn the lock-lug shaft {33} to engage the lock lug slots {35} in the strap-holding-device, to "lock" said device in preparation for use.

The drum {1} is of sufficient diameter to allow easy loading of the bulk-bags {18} and strap-holding-device {40}. At its top, the drum {1} has a lip-out {7} such that it provides a flat surface to engage the contact/compression seal {10} and also a rim {42} around which the slightly smaller diameter of the poly-envelope {8} can attach. Also, located under the lip {7} attached to the surface of the drum {1} are four loop guides {51} and four loop hooks {37}. These hooks {37} allow for a secure attachment and easy removal of the bulk-bag loops {36} when needed. At the bottom, the drum {1} has a lip-out {3} sufficient enough to allow the lower bearing assembly {53} to maintain the drum {1} in proper position through-out its operation. The drum legs {54} located on the bottom of the drum {1} properly elevate the drum {1} such that it rests between the upper central and the two lower lateral {53} bearings of the bearing assembly when in the dolly frame {2} is in the vertical position.

The bag preparation is completed by removing the fork-lift forks {48} from the loops {36} and pulling the excess length of the poly-envelope {8} previously prepared back and over the rim {42} of the drum {1} stretching and hence sealing the interior of said drum {1} from the exterior of the bulk-bag {18}. The four loose loops {36} of the bulk-bag {18} are then pulled over the rim {42} of the drum, on top of the afore mentioned poly-envelope {8} and fed through the loop guide {51} and slipped onto the loop hooks {37}. Drums would normally be prepared in advance in the above manner. In order to have an inventory of prepared bulk-bags ready for emptying.

The operation cycle of the assembly given in FIG. 1 is next given. A prepared drum {1} as described in connection with FIG. 2 is loaded onto the vertically positioned dolly frame {2}. The bottom lip {3} of the loaded drum {1} maintains drum position by means of bearings (not shown). The operator activates hydraulic cylinder {4} causing the dolly to tip on pivot {57}. The drum is secured to the dolly by a drum retainer {58} with latch {59} and with contact bearings {60} that roll against the drum {1} surface. The latch {59} allows for easy release and locking of said drum. The dolly action causes the drum to tip from vertical to horizontal. The operator then activates the traversing cylinder {5} causing the dolly frame {2} and dolly stand {6} to traverse forward until the drum top lip {7} with poly-envelope {8} contacts the previous poly-envelope {9} on the contact/compression seal {10}. [See FIGS. 7a–d]. The poly-envelope {9} from the previous cycle has remained intact and is stretched over the ring {11} around the contact/compression seal {10}. This maintains the continuous seal between the atmosphere and interior of the discharge chamber {12}. From the front cover {55}, the operator reaches into the glove box {13} with filtered exit valve {14} and pulls the previous poly-envelope {9} into the discharge chamber {12} area and effects a "slip-seal" exchange. The previous poly-envelope {9} that was in direct contact with the contact/compression seal {10} is removed by slipping it off the ring {11}, past the contact/compression seal {10} and into the discharge chamber {12} for disposal. The new poly seal {8} is in direct contact with the contact/compression seal {10}. As the previous poly envelope {9} is pulled into the discharge chamber {12}, it is fed into the disposal exit collar {15}. This collar extends outward and is adapted to tightly secure the disposal poly-tube {45} which is sealed at the other end. Said poly-tube is of sufficient length to be gathered-back and stored over the disposal exit collar {15}. By reaching in from the sealed end {46} of the disposal exit collar {15} and simultaneously reaching through the glove box {13}, the operator is able to transfer from one hand to the other control of the old poly envelope {9}. At any time henceforth, the disposal cycle may be completed as described later.

With the newly attached bulk-bag {18} exposed, the operator reaches in through the glove box {13} and unties the tie {16} of the duffle top {17}. After securing the loose duffle top {17} to the fastening ring on the inside wall of the discharge chamber {12}, the system is ready to begin discharging the contents of the bulk bag {18}.

Slow rotation of the bulk-bag {18} within the exoskeletal drum now in a horizontal position begins the discharging avalanche of raw material. Power for rotation is provided by a drive device attached to the drive shaft {20}, such as a hydraulic motor or gear reduced electric motor. Drum {1} rotation is effected by the dolly's drive shaft {20} and wheels {21} upon which the drum {1} rests. This rotation is transferred directly to the rotating discharge chamber {12} by engagement of the receiver assembly {22} mounted on the drum {1} and the drive pin {23} mounted on the discharge chamber {12}.

The angle of repose {24, see FIGS. 3–6} of a specific raw material determines how high that raw material rides up the side of the drum {1} and bulk-bag {18}. The more difficult the flow (greater angle of respose) the greater the potential energy imparted to the restricted raw material particles. Rotating beyond its angle of repose, to its angle of slide {52} causes the exposed surface of the raw material to avalanche down and forward into the discharge chamber {12} that feeds the discharge passageway {25}. Rotation effectively removes most of the contents.

With reduced volume, the raw material again approaches its angle of repose and avalanching slows. To return to its angle of slide {52} the main frame {27} with drum {1} is tilted upward from horizontal about its pivot point {38} and effects complete discharge. The operator activates the hydraulic cylinder {31} that pushes against the base {56} and tilts up the main frame {27} pivoting about the discharge cylinder {26}.

The raw material flows from the bulk-bag supported externally by the drum {1} through the discharge chamber {12} down into the discharge passageway {25} and through the discharge cylinder {26}. The discharge cylinder {26} is a cylinder around which the main frame {27} supporting the dolly assembly {2 and 6} pivots (tilts up and down). As raw material enters the discharge passageway {25} from the discharge chamber {12}, a power driven auger {28} rotates clock-wise (or counter-clockwise) moving the raw material to the right (or to the left) to the transfer chamber {29} for removal. The feed rate of said auger {28} is adjusted to equal or slightly exceed the capacity of the transfer system {30} and it provides a positive raw material feed to said transfer system. From the discharge cylinder {26}, the raw material travels into the transfer chamber {29}, which remains stationary, and is the interface between the outside transfer equipment {30}, and the discharge cylinder {26}. This particular implementation utilizes a helical conveyor; most industrial transfer devices would work equally well.

After the bulk-bag {18} is emptied, the operator actuates the tilt cylinder {31} to its tilted down, horizontal position. The lock-lug {32} assemblies located in the bottom of the drum {1} are released by turning each release handle {34} attached to its shaft {33}, the operator turns the lock-lugs {32} to their unlock position by disengaging the slot in the strap-holding-device {35}. The operator moves to the side and frees the loops {36} at each of the four loop hooks {37}. Using the glove box {13} the loops {36} are pulled inside the discharge chamber {12} and fed into the disposal exit collar {15}. The full volume of air of the empty bulk-bag is allowed to filter out of the discharge chamber area. A filtered exit valve {14} insures a contaminate free discharge of this volume of air. The filter fabric that was used to make the glove is ample for such a task, however vacuum assistance from the optional vacuum port {39} could reduce the time from approximately a minute to a fraction of that if need. As the air leaves the discharge chamber {12}, the strap-holding-device {40} is advanced forward until it is secured in the discharge chamber {12}. The operator now moves to the side of the unit and stretches the poly-envelope seal {41} around the lip of the drum {7} over the rim {42} and back over and onto the adjacent ring {11} attached to the discharge chamber {12}. The diameter of this ring {11} around the contact/compression seal {10} attached to the discharge chamber, is the same as that of the drum rim {42} and the slightly smaller diameter of the poly-envelope {8} also causes it to maintain its pressure fit around this ring for the same reason. The seal has been transferred [FIG. 7d] from the drum {1} to the ring around the contact/compression seal attached to the discharge chamber ring {11}.

The operator now activates the cylinder {5} to traverse back the entire drum {1} and dolly assembly {2 and 6}. The operator continues by tipping down the drum {1} secured to the dolly assembly {2 and 6} from horizontal to vertical. The drum {1} is detached and removed.

The last step is the removal of the strap-holding-device {40} from the back of the discharge chamber {12} area. Access at the rear of the discharge chamber {12} now enables the clamps {43} on the strap-holding-device {40} for each of the four straps {44} to be "unbuckled" and released. The strap-holding-device {40} is lifted out of the back of the sealed discharge chamber {12} and removed.

The bulk-bag {18} which was partially pulled out into the disposal exit collar {15}, is pulled most of the way out which also starts the attached poly-envelope {8} into the poly-tube {45} attached to the disposal exit collar {15}. This action actually is turning the poly-envelope "inside-out" (the contaminated side remains toward the discharge chamber {12} area. The action stops after said poly-envelope {8} has been partially pulled out of the disposal exit collar {12} to a point at which tension is placed on the poly-envelope {8} still stretched around the compression seal ring {11}. At this point the designation of current or new poly-envelope {8} changes to old or previous poly-envelope {9}. The discharge cycle has been completed and attachment of new prepared drum with contents begins another cycle.

The next step in the operation is disposal of the bulk-bag and the poly-envelope in an environmentally acceptable manner.

After the next drum of the new cycle has connected the compression seal with bulk-bag {18} and attached poly-envelope {9} pulled most of the way out into the disposal exit collar {15}, by grabbing the loops {36} of the bulk-bag {18} with the closed end of the poly-tube {46} and pulling forward, draws the bulk-bag to the end of the poly-tube. In this way the bags are connected as "sausages" and a new link is formed as each new bag is pulled into the disposal exit collar {15} with poly-tube {45}. By sealing the area at the link {47} between each "sausage" and cutting it in the middle, a non-contaminating disconnection of these disposal units is easily accomplished. Heating each joint and pulling it apart while warm provides an excellent seal. The disposal units now consisting of the encased poly-tube in which the bulk-bag with poly-envelope attached with plastic tape is isolated in a "sausage" that can be melted down to a 5–10 lb plastic brick. This plastic brick encapsulates any remaining particulate matter is the emptied bulk-bag into a solid mass suitable for disposal at standard municipal landfills. This completes the disposal cycle.

The particulate solids which are most advantageously contained from the environment in accordance with this invention are hazardous or toxic materials, such as, asbestoses, carbon blacks, clays, powdered pesticides, chemicals, plastics, resins among others. The methods and apparatus and bulk bags of this invention are also usefull in containing from the environment during their unloading from shipping containers other materials such as flours, grains and powdered foods which in and of themselves are not harmful, except when fines or dusting is involved in their unloading operations.

The bulk bag shipping containers of this invention are made of flexible fabric, such as woven poly-propylene fabric with four nylon loops at the top for lifting and four nylon straps at the bottom corners to allow for the bag to be secured to the strap holding device. The bag is constructed, in accordance with a preferred embodiment of this invention, using a 42 inch wide piece of fabric. Two sides of the bag are sewn together along a common seam, to produce a bag which when loaded holds approximately 2400 pounds of particulate material in the dry state, and spreads to no more than 48 inches in diameter when loaded, and is 48 to 54 inches in height. This size allows for stable stacking and side by side loading in standard vehicles such as trucks, trailers and railroad cars. The duffle-top is formed by employing a separate poly-envelope liner being slipped over the bag or by sewing or otherwise securing, a double duffle-top to the perimeter of the bag at its upper part in conjunction with its emptying spout, leaving enough material to form both the spout and its closure and the poly-envelope seal. Thus, in accordance with this invention, the bulk bag shipping container has both the duffle-top emptying spout and the poly-envelope for making the seal secured together in one unit construction. The bulk bag may be coated with plastic or other sealant, especially at its seam to prevent dusting of the fines or particulate matter it is to contain.

The drum employed in this invention for holding the bulk bag may be a can of cylindrical shape, with a bottom and lip-out at the top, to provide a rim on which to implement the required rotation. The main function of the drum is to provide a rigid exoskeleton to the flexible bulk bag being emptied. The drum or can may be made of any suitable material of construction, such as plastic or metal, as long as it is of sufficient strength for the desired size of the unit. Ordinary rolled carbon steel has been found satisfactory of about ¼ inch thickness for a unit handling a loaded bulk bag of about 2400 pounds. The dimensions of the drum are made to accommodate the desired size of the bulk bag to be emptied. In order to handle a 2400 pound bag the drum required is about 48 inches in diameter and 60 inches in height, allowing for a 6 inch false bottom space for the strap holding device and space of about 6 inches at the top. The size of the unit may vary to accommodate bags of just a few hundred to a few thousand pounds, depending on just what is desired.

The drum or can rotating mechanism supports the drum and allows it to rotate while being driven by one of its two axes, both being parallel to the can. Both parallel axles are driven by a common drive shaft. An important function of the rotating mechanism is to allow for control of the different rates and number of turns on the contents of the bulk bag being emptied, depending on the particulate material, its angle of repose, and the angle of slide encountered during emptying. This may be accomplished by any one of a number of available mechanisms, such as variable speed hydraulic or electric motors hooked up to suitable control devices.

The drum or can lift mechanism is attached to the drum or can containing the load such as the 2400 pounds of dry particulate material in the bulk bag described above. This mechanism moves the loaded drum from the vertical position to the horizontal and then the drum travels toward the frames vertical section until the lip contacts and compresses the seal on the ring assembly. Toward the end of the emptying cycle the drum rotating assembly tilts to a maximum of 45 degrees from vertical zero. When the emptying is complete the reverse action i.e. straightening, seal-release, travel back, move horizontal to vertical and can release is allowed for. Thus, the drum lift mechanism lifts the drum, turns it into horizontal position, makes contact with the seal and allows for drum rotation.

The frame lift mechanism allows the entire frame, drum and drum rotation assembly to tilt forward to an angle of from 0 to 45 degrees and return. The tilting action is necessary to facilitate the final discharge of the last several hundred pounds of particulate dry solids from the 2400 pound bulk bag. In the embodiment of this invention being used to describe it in detail, i.e. the 2400 pound bulk bag size, the height of the frame tilt mechanism is less than 14 feet and its width is about 5 feet, with a total overall length of about 12 feet. The frame pivots about its discharge assembly and it is capable of stopping at any angle between 0 and 45 degrees. The tilt control device is preferably regulated by a load cell comparision device which is capable of determining the discharge flow rates in accordance with the automated and computer controlled aspects of my invention.

The frame assembly of this invention consists of the vertical frame component, the pivoting horizontal frame component and the frame base with the pivot point. At its front, the horizontal frame component has attached the frame tilt mechanism; at its rear, the horizontal frame component has attached the drum rotating and lifting mechanism. The vertical frame component has the cover at its front. Internally, the vertical frame provides support for the ring assembly. Both the vertical and horizontal frame components are integrally attached. All the above pivots as a unit about the frame base pivot point. The function of the frame is the interface between the drum lifting and rotating mechanisms and the front cover. It allows for the support and alignment of the ring assembly and thus the seal to which the can lip must contact. It pivots about the discharge shoot at the front during the tilting procedure. The frame tilting mechanism attaches to the frame and controls and supports the frame movement. The frame employed in the 2400 pound bag unit may satisfactorily be made from 3 inch×3 inch×0.25 carbon steel tubing.

The ring assembly consists of the ring around the contact seal and the ring securing the duffle-top of the bag and is held in place by the frame. The ring is a cylinder with a seal attached to the outside on one end. It turns within the frame and is guided by 4 roller assemblies running in the channel on its outside surface. The ring rotates with the drum, being driven by contact with the lip seal contact, it maintains the contact seal with the drum lip and allows for the poly-seal to be easily transferred from the drum lip to the ring assembly's lip. The ring assembly functions to provide, on its inside surface, a shoot from the bulk bag to the opening in the front, i.e. the discharge shoot. The ring assembly also maintains the closed system while the poly-seal transfer is taking place. The outside surface provides a regular smooth surface that enables dust tight seals to be made.

The front cover, which includes the vacuum port, the disposal exit collar, the glove box, and a drain tube to wash out the interior of any loose particulate material during maintainence, is attached to the vertical section of the frame component and the horizontal frame hopper which includes the discharge cylinder. It allows for visual inspection of the discharging procedure and remains dust tight. The cover has a bag discharge port for the waste bags. It can be removed for seal and ring assembly maintenance. The function of the cover is to form a dust enclosure, view port and allow for handling access and maintenance and air control on the system.

The control asystem must perform all the seven actions described in connection with the operation of the methods and apparatus of this invention; namely, raising and lowering the loaded bulk bag held in the drum; moving the so held drum to vertical and horizontal positions; rotation of the drum; tilting from zero to 45 degrees; moveing the unloaded particulate solids to the transfer system and operating the transfer system. Low speed high torque hydraulic motors or electric motors are an ideal match for the systems requirements, and such a system lends itself to being automatically controlled by microprocessors.

The transfer system for moving the emptied particulate solids from the hopper in the front cover to the premix or process area is preferably a rotary helix type of device, it may be any suitable means for moving the dry solids such as employing vacuum or pressure type devices for movement of solids. It is a feature of this invention to provide for a controlled rate of discharge from the transfer system to the process equipment receiving the solids as raw material to be further processed or chemically reacted.

The methods, apparatus and articles of this invention allow for the emptying of bulk bags containing hazardous or toxic particulate materials in an environmentally safe and acceptable manner automatically, with minimum labor and virtually no exposure of personnel to the dusting and fines usually associated with such unloading operations. In fact the invention allows for computer control from a site remote and protected from the area of unloading operations. For example, when the system is employed for unloading asbestos from bulk bags into process equipment where it is to be used as a raw material personel do not have to stay in the operations area, and if they should, the area is safe and clean meeting all federal, state and municipal regulations for handling asbestos.

Although this invention has been described using specific examples and preferred embodiments, I do not intend to limit the invention except as expressly defined in the appended claims.

I claim:

1. An apparatus for discharging bulk material particulate in an environmentally acceptable manner from containers comprising:

a drum adapted to retain a bulk container and a poly-envelope, a dolly with a cradle fastened to a frame, the combination of said dolly and frame having means for causing (a) vertical to horizontal movement of said drum, (b) horizontal-lateral movement of said dolly, (c) rotational movement of said drum and (d) for tilting said combination to a 45 degree angle from the horizontal by means of a pivot axis, an attached discharge chamber capable of rotation about the same axis as said drum, surrounded at one end by a contact surface with a perimeter ring, and open at the other end to an area common to (a) a passageway for the removal of said discharged particulate material, (b) a disposal exit collar, and (c) a remote external access means, said passageway located below said discharge chamber (a) receiving the discharged contents of said bulk container and (b) controlling the flow rate of the discharged particulate material in conjunction with the regulated flow rate provided by variations of rotation and tilting of the cradled drum, said passageway providing both (a) the axis of pivot of said frame and (b) an attachment point for standard transfer apparatus feeding process equipment, said poly-envelope being made of flexible material capable of (a) forming a contact seal against an old remaining poly-envelope on the contact surface of the discharge chamber and sustaining the continuous seal formed between the envelope containing the bulk container and the discharge chamber disposal exit, and (b) being turned inside-out and remaining attached to the bottom of the bulk container during a disposal cycle, said disposal exit being fitted with means for removal of the emptied bulk container and old envelope.

2. The apparatus claim 1 wherein a force required for cradle movement is provided by means such as hydraulic cylinders.

3. The apparatus claim 1 wherein a force required for traversing movement of dolly is provided by means such as hydraulic cylinders.

4. The apparatus claim 1 wherein a force required to tilt the frame to 45 degrees is provided by means such as hydraulic cylinders.

5. The apparatus claim 1 wherein the discharge chamber while rotating along the same axis as the rotating drum maintains a stationary contact seal between the drum and the discharge chamber.

6. The apparatus claim 1 wherein the drum provides the rotational force required to turn the discharge chamber by means of an assembly such as a drive pin and receiver.

7. The apparatus of claim 1 wherein the inside of the discharge chamber provides an attachment for a duffle top.

8. The apparatus of claim 7 wherein an internal attachment to the discharge chamber suspends a ring of sufficient diameter to secure the duffle top by a pressure fit and maintain a full and complete opening of said duffle top through-out continuous 360 degree rotation.

9. The apparatus of claim 1 wherein the disposal exit collar has an adaptation for the renewal of supply of poly-tube.

10. The apparatus of claim 9 wherein the disposal exit collar seals an open end of the poly-tube to its collar by pressure fit.

11. The apparatus of claim 9 wherein the poly-tube is maintained and replaced by slipping the old seal from its sealing surface while inside the new poly-tube.

12. The apparatus of claim 1 wherein the volume of air added with attachment of a new bulk-bag and envelope, is allowed to exit through filtered media.

13. The apparatus claim 12 wherein the filter media required is provided by the glove-box fabric.

14. The apparatus claim 13 wherein the exit of air is accommodated by an optional filtered vacuum apparatus.

15. The apparatus claim 1 wherein the pivot point of the frame is about a cylinder simultaneously used for passageway of discharged particulate to a process transfer device.

16. The apparatus claim 1 wherein the drum position is maintained by a bearing group at a position such as on the lip on the bottom of the drum.

17. The apparatus of claim 1 wherein a force required for cradle movement is provided by means such as screw feed motors.

18. The apparaus of claim 1 wherein a force required for traverse movement of the dolly is provided by means such as screw feed motors.

19. The apparatus of claim 1 wherein a force required to tilt the frame to 45 degrees is provided by means such as screw feed motors.

* * * * *